United States Patent [19]

Suzuki et al.

[11] Patent Number: 4,501,115
[45] Date of Patent: Feb. 26, 1985

[54] TRACTION TYPE ELEVATOR SYSTEM

[75] Inventors: Katsuhiko Suzuki, Nagoya; Seihachi Naganuma, Kawasaki, both of Japan

[73] Assignees: Mitsubishi Denki Kabushiki Kaisha; Tokyo Rope Mfg., Co., Ltd.; Hakko Kouyu Co., Ltd., all of Tokyo, Japan

[21] Appl. No.: 482,704

[22] Filed: Apr. 6, 1983

[30] Foreign Application Priority Data

Apr. 12, 1982 [JP] Japan ................... 57-60485

[51] Int. Cl.³ ............... D02G 3/36; D02G 3/06; C09K 3/14
[52] U.S. Cl. ....................... 57/220; 106/36; 57/221; 57/222; 57/223; 252/73; 252/76
[58] Field of Search .............. 252/73; 106/36; 57/220-223

[56] References Cited

U.S. PATENT DOCUMENTS

| | | | |
|---|---|---|---|
| 3,608,385 | 9/1969 | Duling et al. | 252/73 |
| 3,835,050 | 9/1974 | Green | 252/73 |
| 3,838,752 | 10/1974 | Berkovitz | 187/20 |

*Primary Examiner*—Theodore Morris
*Attorney, Agent, or Firm*—Leydig, Voit, Osann Mayer and Holt, Ltd.

[57] ABSTRACT

A wire rope for use in a traction type elevator system is coated with a soft-solid agent or a greasy agent having a drip temperature higher than 55° C. and exhibiting physical properties such that it is evaporated in an amount less than 1 weight percent at 105° C. for an interval of eight hours and elevates the coefficient of friction or traction between the wire rope and the drive sheave when coated on the wire rope.

19 Claims, 2 Drawing Figures

TRACTION TYPE ELEVATOR SYSTEM

BACKGROUND OF THE INVENTION

1. Field of the Invention

This invention relates to a traction type elevator system and more particularly to an improvement in wire rope oil aimed at elevating traction efficiency.

For better understanding of the wire rope used in the conventional traction type elevator system, reference is had to FIGS. 1 and 2 for explanation of the traction for such elevator system.

In the drawing, the numeral 1 designates a driving sheave for an elevator hoist, not shown and having a groove 1a. The numeral 2 designates a guide wheel and the numeral 3 a wire rope placed around the sheave 1 and the guide wheel 2. The numeral 4 designates a car suspended from one end of the wire rope or cable 3. The numeral 5 designates a counterweight suspended from the other end of the wire rope 3. The wire rope 3 is made up of strands 3a and a central flax rope 3b.

In this traction device, travel of the car 4 and the counterbalance 5 takes place through the wire rope 3 and based on friction between the groove 1a of the sheave 1 and the wire rope 3. The marginal sliding traction ratio of the wire rope 3 is given by the following equation (1).

$$\frac{T1}{T2} = e^{k\mu\theta} \quad (1)$$

where T1 is the wire rope tension at the side of the car 4, T2 the wire rope tension at the side of the counterbalance 5, $\mu$ a friction coefficient or traction coefficient between the groove 1a and wire rope 3, k a factor depending on the profile of the groove 1a and equal to $$\frac{4(\sin \gamma/2 - \sin \alpha/2)}{\gamma - \alpha + \sin \gamma - \alpha},$$

$\alpha$ the undercut angle of the groove 1a, $\gamma$ the angle of contact of the wire rope 3 with the groove 1a and $\theta$ the angle of contact of the wire rope 3 with the driving sheave 1.

It is observed that the traction ratio T1/T2 is changed with load and according as the car is accelerated or decelerated and becomes maximum when the car is raised under full load or when the car undergoes maximum acceleration during descent under no load.

For instance, considering a system in which the weight of the car 4 is equal to W1, the weight of the counterbalance 5 equal to W2, the maximum load is equal to W, with $W2 = W1 + W/2$, the maximum acceleration is equal to $\alpha g$ and in which the weight of the wire rope 3 etc. is neglected, the traction ratio is given by $$\frac{T1}{T2} = \frac{(W1 + W)(1 + \alpha)}{W2(1 - \alpha)} = \quad (2)$$

$$\left(1 + \frac{W}{2W1 + W}\right)\left(\frac{1 + \alpha}{1 - \alpha}\right)$$

when the car is accelerated while travelling upwards under full load, and by $$\frac{T2}{T1} = \frac{W2(1 + \alpha)}{W1(1 - \alpha)} = \left(1 + \frac{W}{2W1}\right)\left(\frac{1 + \alpha}{1 - \alpha}\right) \quad (3)$$

when the car is accelerated while travelling downwards under no load. It is essential that the traction ratio of the equations (2), (3) be not is excess of $e^{k\mu\theta}$ of the equation (1).

However, when the weight of the car 4 is reduced for the sake of material saving and reduction of manufacture costs, the traction ratio given by the above equations is increased. In addition, when the hoist is small-sized for the sake of material saving and reduction of manufacture costs, and the diameter of the driving sheave 1 is reduced the angle $\theta$ becomes small. For increasing the durability of the wire rope 3 and the drive sheave 1 and thereby improving safety and reliability of the traction system it is also necessary to reduce the angle $\alpha$ and if possible to reduce the angle $\alpha$ to zero, that is, to use a U-groove as groove 1a. Hence, for a larger traction ratio, the values of the coefficient k and the angle $\theta$ and hence the value of $e^{K\mu\theta}$ in the equation (1) become small so that the traction as required may not be realized. By this reason, a demand has been raised on the rope grease having a higher traction coefficient $\mu$.

Polybutene used as base for grease is manufactured by heat cracking of naphtha from the petrochemical manufacture process to a C4 fraction from which butadiene is extracted to give a residual butane-butylene fraction which is then reacted in the presence of a catalyst to give a copolymer of isobutylene and n butylene, with isobutylene being the main component. It is a polymer with a medium molecular weight (so-called oligomer). Thus it is neither a low polymeric organic compound with a molecular weight less than about 300 nor a typical high polymeric compound with a molecular weight in excess of 10,000. More particularly, it is a liquid polymer with a molecular weight equal to 300 to 2,500. A compound obtained upon hydrogenating the terminal double bond of the compound also belongs to the polybutene group. Liquid polyisobutylene which is a low polymer of high purity isobutylene may have the molecular weight of the order of 8,000 to 15,000 which is larger than that of the polybutene fraction.

Since polybutene and liquid polyisobutylene are non-drying and superior in chemical stability tackiness and low volatility, they are used as additives for a variety of greases including wire rope grease or prepared oils and as basis for constituent carriers.

Recently, a demand has arisen for an oil having a high traction coefficient, especially an oil used with motion transmitting components. Most of the oils used for this purpose exhibit non tackiness and higher volatility so that they are not useful with components of the elevator system which are exposed because of volatility, although they are highly suitable for lubrication of closed-system components. It has been observed that the elevator wire rope is generally used for about ten years and is generally driven on the drive sheave about 10,000,000 times. The wire rope must operate under severe conditions where the oil supplied to the wire rope tends to be scattered and mixed with metal powders worn off from metal components and where the humidity is high. The wire rope grease is therefore required to be low in volatility, wear-resistant and excellent in tackiness, oxidation stability and protectiveness. In addition, there is an increasing demand for a wire rope grease having a higher traction coefficient.

A grease made from polybutene or liquid polyisobutylene as discussed above tends to have a higher traction coefficient, as described in the Japanese Patent Publication No. 47-35763 corresponding to the U.S. Pat. No. 3,608,385. However, this grease has been developed for improving the traction effect when used with a motion transmission system and is not usable satisfactorily as elevator wire rope.

Since polybutene or liquid polyisobutylene is essentially fluid, while being tacky in general, it tends to drip from the elevator wire rope placed on the drum when coated as it is on such wire rope. Therefore, it must be soft-solid or semi-solid or in the form of grease in order to prevent such dripping. To this end, however, the thickness must be of such kind and used in such amount that will not deteriorate the traction coefficient, and the oil must be of such type that will satisfy the aforementioned oiling process employed in the manufacture of the wire rope.

SUMMARY OF THE INVENTION

In view of the foregoing, it is an object of the present invention to provide a wire rope for a traction type elevator system in which a predetermined traction effect may be realized, even with a U-shaped drive sheave groove or a small angle of contact of the wire rope on the drive sheave, through the use of an oil type having a high friction coefficient between the drive sheave and the rope, low volatility and a high drip point.

In view of the above object, the present invention resides in a traction type elevator system in which the wire rope placed around a drive sheave of the elevator system is coated with a soft-solid oil agent or a greasy oil agent having a drip point higher than 55° C. and exhibiting physical properties such that it is evaporated in an amount less than 1 weight percent at 105° C. for an interval of eight hours and increases the coefficient of friction or traction between the wire rope and the drive sheave when coated on the wire rope.

DESCRIPTION OF THE PREFERRED EMBODIMENTS

Figure 1:
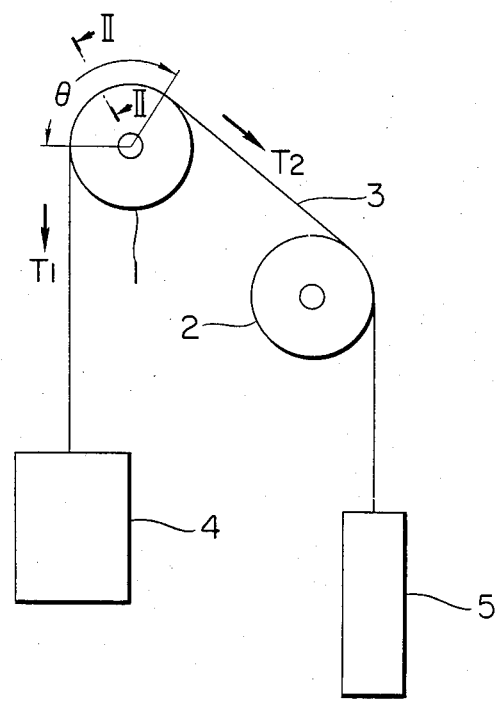
FIG. 1 is a schematic view showing the traction type elevator system embodying the present invention.
Figure 2:
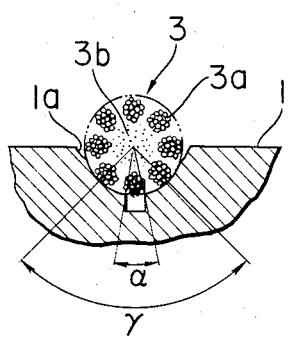
FIG. 2 is an enlarged sectional view taken along line II—II of FIG. 1.

In the description below, some examples of the oil used in the elevator wire rope of the present invention, that is, semi-solid or greasy oil consisting essentially of polybutene and liquid polyisobutylene (called hereafter liquid C4 polymer base) are described in detail.

THICKENERS FOR OBTAINING PETROLATUM-LIKE SEMI-SOLID OIL

As a wax used as a thicknener may be mentioned (a) mineral oil wax such as microwax, paraffin wax etc.; (b) synthetic hydrocarbon wax (wax yielded by synthesis of cracked coal gas by the Fischer-Tropsch method; (c) olefine derivative polymer wax such as polyethylene wax or α-olefine wax; (d) aliphatic acid derivation wax such as amide wax or ketone wax; (e) mineral wax such as montan wax; (f) animal wax such as beeswax or whale wax; and plant wax such as carnauba wax.

According to the present invention, when the high-melting hard mineral oil hydrocarbon wax or synthetic hydrocarbon wax as per items (a) and (b) above with a melting point higher than 90° C. and a penetration degree lower than 20 are added in amounts of about 5 to 20% to a liquid C4 polymer base, the latter is converted into a soft, semi-solid, smooth and viscous material with viscosity in the range of 50 to 200 and a drip point higher than 55° C.

The oligomer of the olefinic hydrocarbon as per item (c) is dissolved well in the liquid C4 polymer base to a semi-solid oil. Polyethylene wax is by-produced during manufacture of high pressure polyethylene and has a molecular weight in the range of 500 to 5,000.

Among straight-chain α-olefines obtained by low polymerization of highly pure ethylene in the presence of ziegler catalyst, α-olefin wax with more than 30 carbon atoms and above all the product sold by the Mitsubishi Chemical Industries Ltd. under the trade name of "DIALEN 30" (melting point, 80° C.; penetration degree, 11) is most preferred. Non-crystalline atactic polypropylene wax, by-produced in the process of polypropylene manufacture, is also soluble in the liquid C4 polymer base. The polymer waxes of the oligomers of these olefine derivatives are adjustable in viscosity by the liquid C4 polymer base. The semi-solid oil may be produced with 5 to 20 percent content of the polymer wax.

Amide waxes of aliphatic acids such as palmitic acid or stearic acid, ethylene-bis-stearic acid amide wax or ketone wax such as distearic ketone wax with a melting point higher than 70° C., are added in amounts of about 5 to 20 percent to a liquid C4 polymer base, to yield a semi-solid oil. Especially, with use of ethylene-bis-stearic acid amide such as was EB-P manufactured by the Japan Kao Soap Co. Ltd., a viscous soft-solid or semi-solid oil with a drip point higher than 100° C. is yielded.

As typical of the mineral wax as per item (e) may be stated montan wax obtained from brown coal. This montan wax is oxidized with e.g. chromic acid and reacted with a salt of Ca, Li or the like metal to give a hard high-melting wax, for example, Hoechst wax OP sold by Hoechst AG. This is a Ca-soap wax having a melting point of 105° C. and well soluble in the liquid C4 polymer base to give a greasy soft-solid oil agent.

The animal and plant waxes as per item (f) are not always satisfactory in view of their price, odor and availability, although there are a large number of kinds of waxes belonging to this group. Beeswax (melting point, 70° C.) and carnauba wax (melting point, 90° C.) are soluble in the liquid C4 polymer base and give a smooth glossy semi-solid oil. Caster oil aqueous wax (melting point, 90° C.) is also preferred.

The above waxes of the six groups are added in the amount of 5 to 20% in order to prevent oil drip or scattering to be caused by excessive softness or low drip point, to prevent cracking caused by excessive hardness, or to keep the traction coefficient as high as possible.

THICKENER FOR OBTAINING GREASY OIL

The liquid C4 polymer base can be thickened to grease in a number of ways. In order to be impregnated at ambient temperature in the manufacture process of the elevator wire rope, the grease is preferably soft with a mixing viscosity higher than 265 and required to be mechanically and chemically stable. Moreover, the drip point of the rope grease under the operating condition of the elevator system must be higher than 80° C. These requirements can be satisfied with the following greases.

For instance, a grease into which a soap consisting of Al, Li, Ca or Ba salt of an organic aliphatic acid with 12 to 30 carbon atoms, synthetic aliphatic acids or aliphatic acids containing OH groups are dispersed upon heating and melting, or a grease yielded upon saponification of the aliphatic acid and the metallic compounds in the base, are preferred.

Oliphilic bentonite, so-called benton may be dispersed in the liquid C4 polymer base and crushed in a three-roll mill to a usable heat-resistant viscous grease exhibiting no dripping point. So-called silica-gel grease may be processed into a grease exhibiting no dripping point. Time comminuted silica obtained upon surface hydrophobilization, such as "AERSIL R972" manufactured by DEGUSA AG, West Germany, may be used advantageously for an elevator tube system operating under highly humid conditions.

So-called urea grease, produced upon reacting urea compounds in the liquid C4 polymer base, may also be prepared into viscous grease with a dripping point higher than 200° C. In preparing this grease, 3.9 parts of coconut aliphatic acid amine (with an amine value of 285) and 1.8 parts of aniline are dissolved in 40 parts of polybutene (molecular weight, 630) and the resulting mixture is maintained at 60° C. To a separate batch of 40 parts of polybutene are dissolved 5 parts of diphenyl methanediisocyanate and the resulting product is maintained at 60° C. These two products are mixed together under steady agitation and heated to 180° C. at which point the reaction is terminated. In this manner, a highly viscid grease with a drip point of 272° C. and a viscosity of 323 is produced.

The greases yielded in the above manner may be used not only as impregnating oil in the manufacture of the elevator wire rope, but applied to the wire rope at ambient temperature for maintenance purposes. The semi-solid oil or greasy oil may be impregnated or coated to the wire rope 3 through impregnation in the flax core 3b of the wire rope, or at the twist end of the strands 3a of the wire rope 3. The semi-soft oil may be heated and melted while the greasy oil may be applied under pressure at ambient temperatures for application to these points.

Rust-proofing agents may be added to the semi-solid or greasy oil. These agents must be selected so as not to lower the traction or friction coefficient and thus may, for instance, be amines or metal salts of petroleum sulfonic acid. Likewise, oxidation inhibitors such as 2, 4, 6 di-tertiary butylphenol or Zn diaminethiocarbonate or friction reducing agents such as finely divided graphite, molybdenum disulfide or finely divided ethylene tetrafluoride.

The above typical examples may be summarized in the following Table.

| Ex. No. | Main Composition with M.P. and M.W. | Oil Type | Main Physical Properties | | Traction Coefficient in the actual elevator system |
|---|---|---|---|---|---|
| | | | Drip point °C. | Viscosity (25° C.) | |
| 1 | Polybutene (M.W. 750) Synthetic hydrocarbon wax (M.P. 105° C.) | 92% Soft-solid | 89 | 71 | more than 0.1 |
| 2 | Polybutene (M.W. 9000) 10 parts Polybutene (M.W. 630) 15 parts Synthetic hydrocarbon wax (M.P. 105° C.) | 96% Soft-solid 4% | 92 | 60 | more than 0.1 |

It is seen from the above Table that the oily agents according to the various Examples of the present invention exhibit a traction coefficient which is 15 to 20 percent higher than that of the conventional red rope grease and thus may satisfy the new needs of the elevator as wire rope oil agents.

It will be apparent from the foregoing that since the wire rope for use in the traction type elevator system is coated in accordance with the present invention with a soft-solid or greasy oil agent having a drip point higher than 55° C. and exhibiting such physical properties such that it is evaporated in an amount less than 1 weight percent at 105° C. for an interval of eight hours and elevates the coefficient of friction or traction between the wire rope and the drive sheave, the desired traction can be developed and maintained at low costs and even under adverse operating conditions of the traction system.

What is claimed is:

1. A traction type elevator system comprising a wire rope place around a drive sheave including a soft-solid or greasy agent coated on the wire rope which increases the coefficient of friction or traction between the wire rope and the drive sheave, said agent having a drip point higher than 55 degrees C. and a rate of evaporation of less than 1 weight percent at 105 degrees C. during an interval of eight hours and being comprised of a thickener in an amount sufficient to provide said drip point and a suitable viscosity and at least one of a polybutene or a liquid polyisobutylene as a basic constituent.

2. The system according to claim 1 wherein the molecular weight of said basic constituent is about 300 to about 2500.

3. The system according to claim 1 wherein said agent has a viscosity of about 50 to about 200.

4. The system according to claim 1 wherein said agent has a dripping temperature higher than 90 degrees C. and a mixing viscosity higher than 265.

5. The system according to claim 1 wherein said thickener melts above 90 degrees C. and comprises about 5 to about 20 percent of a synthetic hydrocarbon wax or mineral oil hydrocarbon wax.

6. The system according to claim 1 wherein said agent thickener comprises about 5 to about 20 percent of an olefinic hydrocarbon oligomer.

7. The system according to claim 6 wherein said olefinic hydrocarbon oligomer is a polyethylene wax, an α-olefine wax having more than 30 carbon atoms or an atactic polypropylene wax.

8. The system according to claim 1 wherein said thickener melts above 90 degrees C. and comprises about 5 to about 20 percent of an aliphatic acid ketone wax or an aliphatic acid amide wax.

9. The system according to claim 1 wherein said thickener comprises about 5 to about 20 percent of a metal soap of a montan wax melting higher than 90 degrees C.

10. The system according to claim 1 wherein said thickener melts above 70 degrees C. and comprises about 5 to about 20 percent of an animal wax, plant wax or plant oil hydrogenated wax.

11. The system according to claim 1 wherein said thickener comprises at least two waxes selected from the group consisting of synthetic hydrocarbon wax, mineral oil hydrocarbon wax, polyethylene wax, α-olefine wax having more than 30 carbon atoms, atactic polypropylene wax, aliphatic acid amide wax, aliphatic acid ketone wax, montan wax, animal wax, plant wax, and hydrogenated plant oil wax.

12. The system according to claim 1 wherein said thickener is a metal soap, hydrophilic bentonite, silica or polyurea.

13. The system according to claim 1 wherein said wire rope comprises a fibrous flax core which is impregnated with said agent.

14. The system according to claim 1 wherein said wire rope includes outer strands and a strand twist end and said agent is applied as a heated liquid to the outer strands of the wire rope by injection at the strand twist end.

15. The system according to claim 1 wherein said wire rope has outer strands and said agent is coated on said outer strands at ambient temperature under pressure.

16. In a traction type elevator system comprising a wire rope placed around a drive sheave, a method of increasing the traction between the wire rope and the sheave comprising treating said wire rope with an agent which increases the coefficient of traction between the wire rope and the drive sheave, said agent having a drip point higher than 55 degrees C. and is evaporated in an amount less than 1 weight percent at 105 degrees C. during an interval of eight hours and being comprised of a thickener in an amount sufficient to provide said drip point and a suitable viscosity and at least one of a polybutene or a liquid polyisobutylene as a basic constituent.

17. The system according to claim 16 wherein said wire rope has a fibrous flax core and said core is treated by impregnating said core with said agent.

18. The system according to claim 16 wherein said wire rope includes outer strands and a strand twist end and said agent is applied as a heated liquid to the outer strands of the wire rope by injection at the strand twist end.

19. The system according to claim 16 wherein said wire rope has outer strands and said agent is coated on said outer strands at ambient temperature under pressure.

* * * * *